BEST AVAILABLE COPY

March 23, 1943. P. F. CAMPBELL Re. 22,291

COFFEE BREWER

Original Filed Sept. 14, 1937 2 Sheets-Sheet 1

Inventor

P. F. Campbell

By Clarence A. O'Brien
Hyman Berman

Attorneys

March 23, 1943. P. F. CAMPBELL Re. 22,291

COFFEE BREWER

Original Filed Sept. 14, 1937 2 Sheets-Sheet 2

Inventor

P. F. Campbell

By Clarence A. O'Brien
Hyman Berman

Attorneys

Reissued Mar. 23, 1943

Re. 22,291

UNITED STATES PATENT OFFICE 22,291

COFFEE BREWER

Paul F. Campbell, Saginaw, Mich., assignor, by mesne assignments, to Casco Products Corporation, Bridgeport, Conn., a corporation of Conn.

Original No. 2,143,432, dated January 10, 1939, Serial No. 163,868, September 14, 1937. Application for reissue September 7, 1940, Serial No. 355,704

10 Claims. (Cl. 53—3)

This invention relates to coffee brewers or makers, and, more particularly, to the type in which water heated in a lower vessel is forced through the ground coffee in an upper vessel and then later drawn through the ground coffee back to the lower chamber as the result of partial vacuum being formed in the lower vessel upon cooling of the latter, which type of appliance is herein termed a vacuum coffee maker.

In coffee makers of this type, it was heretofore the custom to provide a lower vessel with a single opening or orifice into which a hollow stem on the upper vessel extends and by the walls of which the upper vessel is supported. Consequently, to pour the brewed coffee from the lower vessel it was necessary to remove the upper vessel and store it in some safe place. The storing of the upper vessel is frequently quite a problem for it cannot be supported upright except on a spindle-like holder which passes through the tube at the bottom of the vessel, and when so supported is easily tipped over because the main weight of the body is so high above the supporting surface.

Another difficulty with the vacuum type coffee makers as heretofore constructed has been the danger of the coffee maker tipping over while the coffee is being brewed, for the weight of the water when forced into the upper vessel moves the center of gravity high above the relatively limited supporting surface of the lower vessel. Besides, when the water from the lower vessel has been expelled to a point where the level thereof is below the orifice of the downwardly projecting tube, bubbles of air are forced up through the liquid in the upper vessel causing considerable agitation and frequently breaking the air-tight seal between the tube and the neck of the lower vessel.

The difficulties above referred to are obviated by the present invention by the provision of a coffee maker of the vacuum type in which the upper vessel and the lower vessel may remain united as one, both while the coffee is being made and while it is being poured from the coffee maker after being brewed. This arrangement permits coffee to be brewed and served at the dining table without the inconvenience and bother which is now attendant upon the removal of the upper vessel after the coffee is brewed and before it may be served. By this arrangement, the seal between the upper and lower chamber is mechanically maintained so that there is no likelihood of seepage of air into the lower vessel through this seal, which seepage would delay the return of the brewed coffee to the lower vessel and might even prevent the return of some of the brewed coffee to the lower vessel.

One of the features of this invention is the provision of upper and lower vessels of a vacuum type coffee maker which are so shaped that, together, they form a substantially spherical body, and so uniting these two vessels that they can be lifted and transported by a suitable handle as one vessel.

The two vessels, however, can be easily separated so that the lower vessel may be cleaned after a brewing operation, and a further feature of this invention is the ease by which the two vessels may be assembled together to form a unitary utensil and disassembled to allow the two vessels to be washed and cleansed after the coffee has been served from the utensil.

The means for uniting the upper and lower vessels comprises an upper and lower casing part connected by a handle member by which the utensil may be lifted and transported. One of the casing parts is preferably attached to the handle by means of a suitable pivotal connection which permits that casing part to be readily removed from engagement with one of the vessels so that two vessels, as explained, may be separated for the purpose of cleaning the vessels after the coffee has been served.

Another feature of this invention is the provision of a pouring spout on the lower vessel through which the brewed coffee may be served and yet which may be completely stopped off during the operation of the device so that the water in the lower vessel will be forced up into the upper vessel by the expansion of it and the air above it.

A still further feature of this invention is the provision of a strainer or filter-receiving means formed on the bottom wall of the upper vessel for receiving and holding a suitably shaped strainer or filter to prevent coffee grounds from being drawn down into the lower vessel during the brewing operation.

The strainer or filter-retaining means, although it holds the strainer or filter against movement during the pouring operation, nevertheless, allows the strainer or filter to be easily removed when the vessels are to be cleaned.

Other features and advantages will hereinafter appear.

Figure 1:
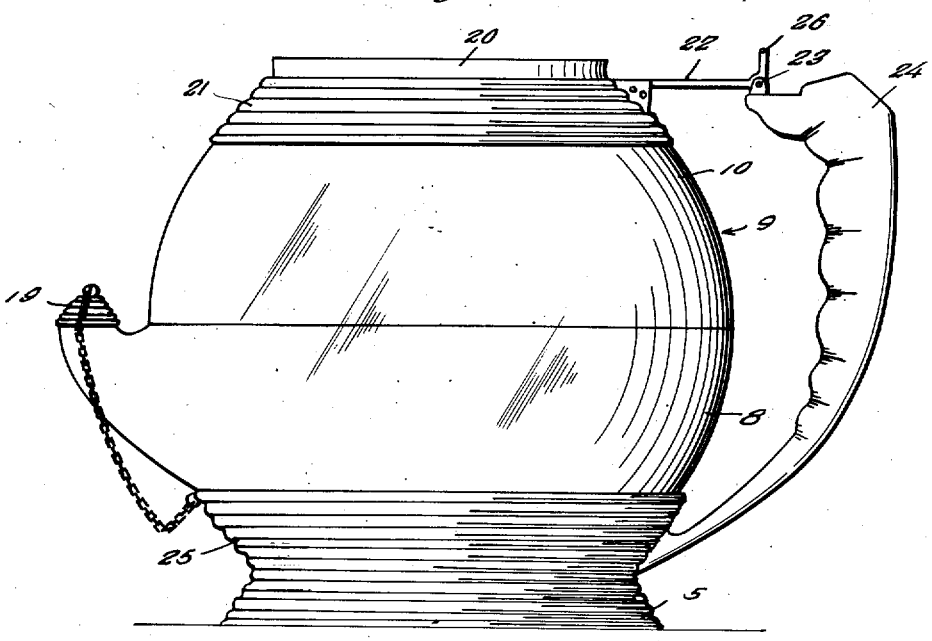
Figure 1 is a side elevational view of the coffee maker of the present invention.
Figure 4:
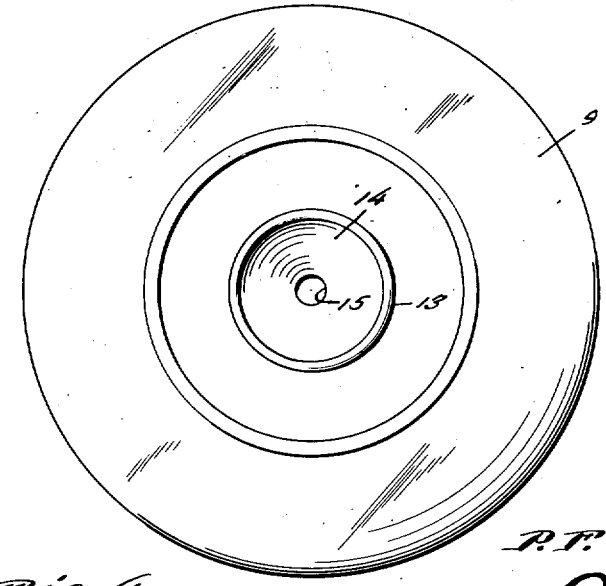
Fig. 4 is a top plan view of the upper vessel removed from its position on the lower vessel.
Figure 5:
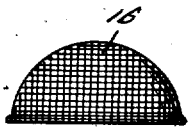
Fig. 5 is a side elevational view of the strainer or filter.
Figure 2:
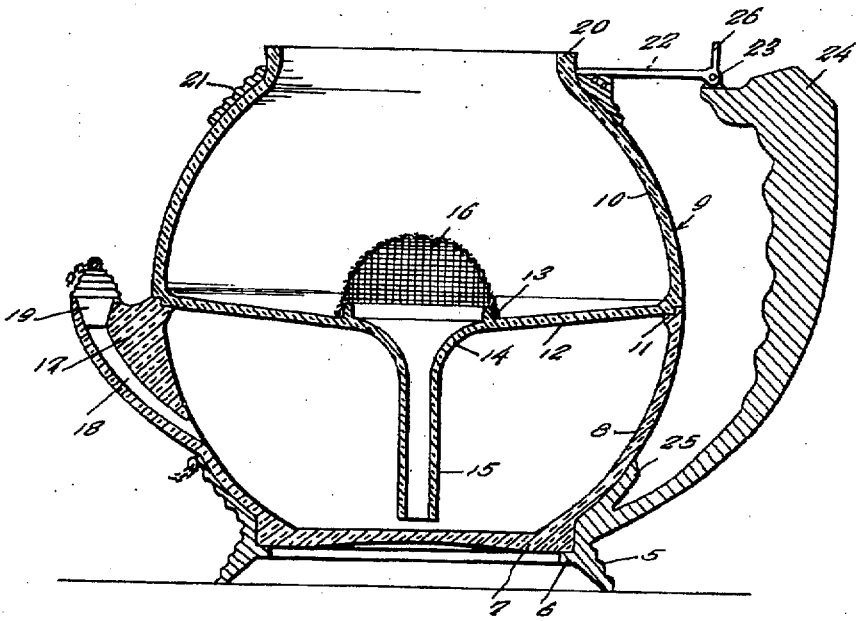
Fig. 2 is a vertical sectional view of the coffee maker.
Figure 3:
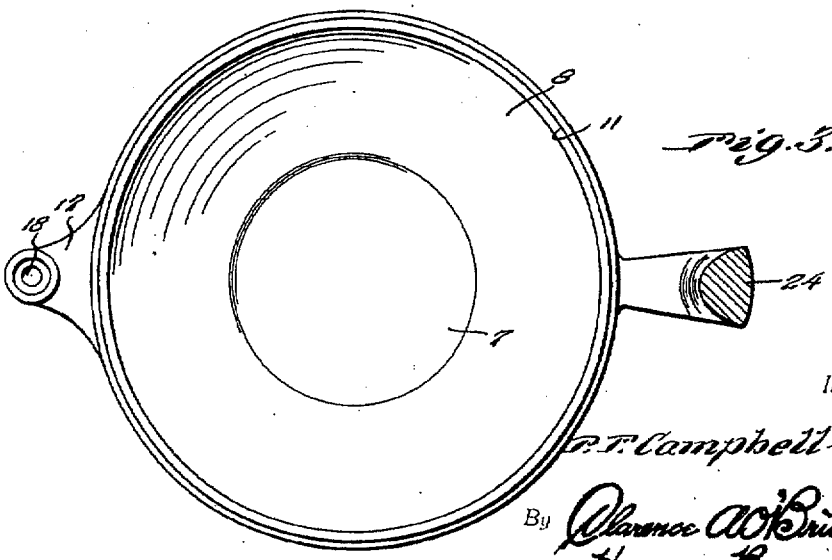
Fig. 3 is a top plan view of the lower vessel with the handle shown in section.

As shown in the accompanying drawings, and referring now particularly to Figs. 1 and 2, the coffee maker of the present invention comprises an annular base 5 having the internal circumferential extending shoulder 6 upon which the flat surface or bottom 7 of the lower vessel 8 of the coffee maker 9 rests.

The coffee maker 9 comprises the lower vessel 8 and the upper section or vessel 10. Each vessel is approximately hemispherical and have their relatively flat sides adjacent, so that when they are assembled, they will form a substantially globular shaped or spherical body.

The lower vessel 8 has a relatively wide open mouth formed with a shoulder or sealing lip 11 upon which the lower wall 12 of the upper vessel 10 seats and so formed as to cooperate with the peripheral edge of the bottom wall and seal the mouth when the upper vessel is superposed on the lower.

The interior surface of the bottom wall 12 is provided with an upstanding annular ridge 13 surrounding the upper flared end portion 14 of the spout 15 which extends down into the lower bowl 8. A suitable dome-shaped strainer or filter 16, disposed over the upper portion 14 of the spout 15, prevents coffee grounds from being drawn down into the lower vessel as the brewed coffee is returned to that vessel after the brewing operation. The strainer or filter frictionally engages the ridge 13 which holds the filter or strainer against movement, but allows the strainer or filter to be readily removed from the upper vessel by a slight tug upwardly exerted on the strainer or filter.

As clearly shown in Fig. 2, the side wall of the lower vessel 8 is thickened as at 17, which thickened portion is provided with a duct 18 extending therethrough and forming an upwardly extending spout through which the brewed coffee may be poured when it is desired to serve the same.

While the water is being heated to drive it up into the vessel 10 it is, of course, essential to prevent the escape of air from the lower vessel 8 because it is the expansion of the water and air in the lower vessel 8 which causes the water to rise in the tube 15.

For this purpose, the spout 18 is provided with a stopper 19 which, of course, may be removed when it is desired to pour the brewed coffee. To prevent the stopper from being misplaced or lost after it has been removed from the spout 18, the same preferably is attached to the lower vessel by a small chain as shown in Fig. 1.

According to the present invention, the lower vessel 8 and the upper vessel 11 are united as one, and, for this purpose, any suitable means may be employed. However, it is at present preferred to unite the two vessels by providing means for holding the two vessels together with the lower vessel tightly seated on the annular base 5. For this purpose, a lip formed at the upper portion 20 of the vessel 10 defines a shoulder upon which seats an annular collar 21. This collar 21 preferably is fluted or given some other exterior design to enhance the appearance of the coffee maker. An arm 22 extends from this collar and is pivotally secured as at 23 to the upper end c the handle 24 which extends upwardly from th flaring side walls 25 of the base 5.

When the annular collar 21 is disposed abou the upper portion 20 of the vessel 10, the tw vessels will be held together with the lower vesse 8 seated on the annular base 5. This, as will b apparent, also maintains the upper vessel tightl seated on the sealing lip 11 of the lower vesse so that the seal between the upper and lowe vessels is mechanically maintaining as long as th collar 21 is in its proper position on the uppe vessel 10.

To permit the collar 21 to be easily moved up ward and out of engagement with the uppe vessel 10, a finger tab 26 is provided on the arn 22 so that the arm and the collar 21 may b pivotally moved by merely depressing the tab 26

It will be seen that when the collar 21 is move out of engagement with the upper vessel 10, th upper vessel may be separated from the lowe vessel by merely removing the upper vessel fron its seat on the lower vessel exposing the interio of the lower vessel so that the same might b readily cleaned.

Variations and modifications may be mad within the scope of this invention and portion of the improvements may be used without other

I claim:

1. A utensil of the character described com prising a bowl-shaped structure divided horizon tally into upper and lower separable sections; rigid handle extending laterally and upwardl from the lower section to terminate adjacent th top of the upper section, the upper section bein provided with a reduced upper portion definin a shoulder; an endless member circumscribin the upper section and adapted to rest upon th shoulder; an arm extending laterally from th member and being pivotally connected to the up per end of the handle; and an upstanding finge tab on the pivotal end of the said arm.

2. A coffee maker comprising an approximatel hemispherical lower vessel and an approximatel hemispherical upper vessel, said vessels bein superposed with their respective flat sides ad jacent; a frame having an upper part and a lowe part adapted respectively to embrace at least part of the upper and lower vessels; and mean for holding said two parts of the frame agains lateral movement so that the said vessels ma be transported as one unitary utensil, the lowe part of said frame having a foot portion formin a support for said coffee maker.

3. A coffee maker comprising an approximatel hemispherical lower vessel and an approximatel hemispherical upper vessel, said vessels bein superposed with their respective flat sides adja cent; a collar engaging and circumscribing th upper vessel; a support for said lower vessel; handle rigidly secured to said support and ex tending upwardly from said support to a poin adjacent said collar for transporting the vessels collar and support as a unitary utensil; an means for pivotally connecting said collar to sai handle, said means holding said collar agains lateral movement while permitting the collar t be moved out of engagement with said uppe vessel whereby the upper vessel may be remove from its superposed position with respect to th lower vessel.

4. A coffee maker comprising an approximatel hemispherical lower vessel and an approximatel hemispherical upper vessel, said vessels bein superposed with their respective flat sides adja cent, said lower vessel being formed with a relatively large mouth closed by the bottom wall of said upper vessel when the latter is superposed thereon, the lip of said mouth being formed and shaped relative to the form and shape of the peripheral edge of said bottom wall as to seal the mouth of the lower vessel; a pouring spout on said lower vessel whereby brewed coffee may be poured from said lower vessel without removal of the upper vessel from its seat; and means including a support for said lower vessel for holding said upper vessel superposed on said lower vessel and against lateral movement relative thereto whereby the two vessels may be handled as one utensil.

5. A coffee maker of the vacuum type comprising a lower vessel and an upper vessel superposed on the lower vessel and having a tube extending into the lower vessel near the bottom thereof; a pouring spout on the lower vessel; a base for supporting the superposed vessels; and means for normally holding the two vessels superposed with the lower vessel seated on said base, said means holding said vessels against relative lateral movement and including a handle for transporting the coffee maker as a unitary vessel and for tilting the same to serve brewed coffee through said spout.

6. A coffee maker of the vacuum type comprising a lower vessel and an upper vessel superposed on the lower vessel and having a tube extending into the lower vessel near the bottom thereof; a pouring spout on the lower vessel; a base for receiving the lower vessel and for supporting the superposed vessels; a handle carried by said base by means of which the superposed vessels may be transported as one; and an annular member engaging said upper vessel and pivotally connected to said handle, said member normally holding said vessels superposed and against accidental separation and movable out of engagement with said upper vessel to permit the upper vessel to be removed from its superposed position relative to said lower vessel.

7. A coffee maker of the vacuum type comprising a lower vessel and an upper vessel superposed on the lower vessel and having a tube extending into the lower vessel near the bottom thereof; a pouring spout on the lower vessel; a base for receiving the lower vessel and for supporting the superposed vessels; a handle carried by said base by means of which the superposed vessels may be transported as one; an annular member engaging said upper vessel and pivotally connected to said handle for holding said vessels superposed and against accidental separation; and manually operable means for pivotally moving said annular member out of engagement with said upper vessel so that said vessel may be separated from said lower vessel.

8. A utensil of the character described comprising a bowl-shaped structure divided horizontally into upper and lower separable sections; a frame including spaced apart bands surrounding and engaging the upper and lower portions of the upper and lower sections respectively; a handle rigidly carried by the lower band and extending upwardly to a position adjacent the upper band of said frame, said lower band forming a support for said lower vessel; and means carried by the handle for holding the upper band against lateral movement with respect to said lower band so that the two vessels are held against relative lateral movement, said means permitting the upper band to be pivotally moved out of engagement with said upper section so that said upper section may be separated from said lower section.

9. A coffee maker comprising a lower vessel having a relatively wide mouth formed with a seat about the rim edge thereof; an upper vessel supported by said lower vessel, said upper vessel having a lower wall formed with means for seating on said seat to seal the mouth of said lower vessel when supported thereon; a frame having an upper part and a lower part adapted respectively to embrace at least a part of the upper and lower vessels; and means for holding the two parts of the frame against lateral movement to prevent the upper vessel from moving laterally of said lower vessel, said means including a handle by means of which the coffee maker may be lifted and carried.

10. A coffee maker comprising an approximately hemispherical lower vessel and an approximately hemispherical upper vessel, said vessels being superposed with their respective flat sides adjacent; a frame having an upper part and a lower part adapted respectively to embrace at least a part of the upper and lower vessels, said lower part including a base member forming a support for the coffee maker; and means for holding the two parts of the frame against lateral movement whereby the two vessels are held against relative lateral movement thereby permitting the two vessels to be transported as a unitary utensil.

PAUL F. CAMPBELL.